United States Patent [19]

Bozzolato

[11] Patent Number: 4,641,960

[45] Date of Patent: Feb. 10, 1987

[54] METHOD FOR THE STEREOPHOTOGRAMMETRIC SURVEY OF LARGE-DIMENSION OBJECTS ON SEA AND LAND

[75] Inventor: Giovanni Bozzolato, Segrate, Italy

[73] Assignee: AGIP, S.p.A., Rome, Italy

[21] Appl. No.: 615,839

[22] Filed: May 31, 1984

[30] Foreign Application Priority Data

Jun. 3, 1983 [IT]  Italy ............................... 21437 A/83

[51] Int. Cl.$^4$ ......................... G01C 11/12; G01C 3/14
[52] U.S. Cl. ......................................... 356/2; 356/12; 356/14
[58] Field of Search ................................ 356/2, 12, 14

[56] References Cited

U.S. PATENT DOCUMENTS 1,396,047  11/1921  Nistri ........................................ 356/2
4,281,923  8/1981  Friedman ................................. 356/2

OTHER PUBLICATIONS

Muga and Wilson, *Dynamic Analysis of Ocean Structures*, Plenum Press, N.Y., 1970, 160–163.

*Primary Examiner*—R. A. Rosenberger
*Assistant Examiner*—Crystal D. Cooper
*Attorney, Agent, or Firm*—Morgan & Finnegan

[57] ABSTRACT

A method for the stereophotogrammetric survey of a large-dimension object is provided in which the object and a chain having two reference markers thereon spaced apart at a known distance are photographed from a height of about 30 m with two synchronized metric photographic cameras spaced apart by about 6 m. Depth measurements (Z axis) are made on a stereoscopic model reproduced by a stereoplotter at eight sets of points grouped in the eight conventional perimetral locations of photogrammetric orientation at the crests and troughs of the ripples or undulations of the water or ground, respectively. The mean of the depth measurements is calculated to determine the mean horizontal plane and the model is correctly orientated with respect to the horizontal plane by suitable rotation. The length of the chain is measured between the two reference markers on the orientated model and the ratio of the chain length measured on the model to the known length of the catenary arc between the markers is used to determine the reproduction scale.

8 Claims, 4 Drawing Figures

METHOD FOR THE STEREOPHOTOGRAMMETRIC SURVEY OF LARGE-DIMENSION OBJECTS ON SEA AND LAND

TECHNICAL FIELD

This invention relates to a new stereophotogrammetric survey method which allows extremely simple and operationally safe high-accuracy measurements of a minute nature to be made, with considerable economy of time and expense, on large-dimension objects of any complexity, even when these are located in uncomfortable and relatively inaccessible positions.

BACKGROUND AND OBJECTS OF THE INVENTION

Various measurement methods are already known in the state of the art, besides the direct classical one using metallic straps with dynamometers, such as those used in topography and geodesy employing specific instruments such as theodolites, tachometers, electronic distance measurers, and coincidence or stereoscopic telemeters. However when the dimensions and complexity of the object to be measured involve a large quantity of data to be obtained together with statistical processing, the aforesaid methods obviously become unpractical and decidedly uneconomical.

In this case stereophotogrammetry is used, this being a widely accepted method in terms of performance, and is well known in the planimetric and altimetric survey of immobile objects on land such as buildings, ruins, structures etc., or of land itself for planoaltimetric topographic, cartographic and other applications.

Stereophotogrammetry is based substantially on the technique of taking measurements on an object by using not the object itself but its three-dimensional photographic image or stereoscopic optical model reproduced in shape and dimensions in space by a stereoplotter, using one or more pairs of photographs of the object each taken from two different shooting points.

Essentially, said known method of stereophotogrammetric survey consists of taking, from two different points, one or more pairs of photographs of an object to be surveyed in order to obtain stereoscopic images of the object itself; previously determining the spatial coordinates of at least five characteristic points on the object itself and adjacent to it, these being necessary for the unequivocal and exact reconstruction of a stereoscopic model free from parallax, for straightening and orientating the model in space by suitably rotating it until it lies perfectly horizontal, and finally for precisely determining the planimetric scale of the stereoscopic model itself, the said determination of said five points in x, y and z spatial coordinates being done by conventional topographic procedures; reconstructing in the laboratory a three-dimensional image or optical model of the object to be surveyed by means of a stereoplotter starting from said photographs and, after correctly orientating the model, making the required measurements on said model instead of on the actual object, the scale which enables any linear measurement on the optical model to be converted into the corresponding distance on the actual object being already known; and finally recording the taken measurements on tape and electronically processing them in order to obtain graphical results drawn by a plotter or numerical results in data-processed tabulated form.

However, even this method has the drawback of not being able to be used in certain surveying applications where for practical reasons of operator safety due to the inhospitable and/or dangerous environment, because of the short time available due to construction site requirements, or for other contingent reasons it is absolutely impossible to make a previous determination of the spatial coordinates of the five points.

This is generally the case in the offshore installation of platforms for hydrocarbon production in the open sea, where in order to install a fixed industrial plant by the monotubular systems, after the support tubes have been driven into the sea bed it is necessary to determine the exact distance between the centres at their ends in order to correctly design the overlying platform, the legs of which have to acurately abut against the ends of the tubes themselves.

In this case, the problem to be solved is to determine with a specified approximation of 1-2 cm the distance between the centres, which are not even marked, of three or more support tubes of diameter 2-3 m which emerge by 8-12 m from the sea, are distanced 20-30 m apart, and are 20-50 km from the shore line.

In addition, each support tube has to be investigated for any circumference and thickness irregularities, the presence of dents due to collision with boats, and the vertical accuracy with which the tubes have been driven in, and thus a plurality of measurements have to be made which only the stereophotogrammetric method would allow. However, taking into account the essential requirement of always safeguarding operator safety, it becomes impossible to effectively make the required measurements directly with sufficient accuracy, and this known method can therefore not be used.

The object of the present invention is to obviate the aforesaid drawback by providing a new surveying method which, while using stereophotogrammetry, does not require direct measurements to be taken on the object to be surveyed and therefore allows easy and precise survey even of objects situated in uncomfortable and relatively inaccessible positions, and specifically of the support tubes for the offshore installation of platforms.

SUMMARY OF THE INVENTION

This is substantially attained in that the photographic shots of the object to be measured are taken from a distance of about 30 m with two metric photographic cameras which are mutually synchronised and spaced apart by a known distance of about 6 m, this being suitable for obtaining the required accuracy of depth measurement with the stereoplotter with a maximum allowable error of ±1 cm.

In this manner, a correct stereoscopic model is obtained on which precision measurements can be made only of stationary objects such as the support tubes for offshore platforms but also of mobile objects such as surface liquids, floats, hanging cables etc.

Thus by simply inserting into the field of the photographic shot a comparison element such as an inextensible steel chain which cannot tangle and of which the length has been accurately pre-measured, it is possible not only to correctly orientate the stereoscopic model but also to obtain from it any linear measurement of the actual object to be measured, as the planimetric scale is easily determinable.

Essentially, the method for the stereophotogrammetric survey of large-dimension objects situated specifically on the sea but also on land, and comprising the reproduction, by means of a stereoplotter, of a stereoscopic optical model of the object to be surveyed from one or more pairs of photographs of the object taken from two different shooting points, is characterised according to the present invention by comprising the following stages in succession: hooking to the object to be surveyed, in such a manner as to be always completely visible, an inextensible steel chain which cannot tangle and on which there are rigidly fixed two reference markers or signals at a known distance apart which has been accurately pre-measured, they being such as to be reliably visible on photograms taken from a distance of 30–40 m; from a distance of about 30 m, photographing the object to be surveyed by means of two synchronised metric photographic cameras spaced apart by an exactly known distance of about 6 m; obtaining a stereoscopic optical model of the object from the pairs of resultant photographs by means of a stereoplotter; measuring on said stereoscopic optical model eight sets of points of adequate number grouped in the eight conventional perimetral locations of photogrammetric orientation and situated evenly one half at the crest levels (positive maximum) and the other half in the troughs (negative maximum) of the ripples or undulations of the water or ground, respectively; statistically processing said measurements in order to determine the mean level horizontal plane; correctly orientating the stereoscopic optical model on said mean horizontal plane by suitable rotation; measuring on the optical model orientated in this manner the length, on the photographic scale, of the catenary arc lying between the two reference markers or signals on said steel chain by taking the sum of the lengths of the small arc portions corresponding to one link of said chain; determining the scale as the ratio of said found value to the accurately pre-measured value; and using this to convert any linear measurement on the optical model into the corresponding distance on the actual object.

According to a preferred embodiment of the present invention, said two synchronised metric photographic cameras are spaced apart by an exactly known distance by means of a beam constructed of high-strength metal such as Duralumin, special steel etc., at the ends of which said photographic cameras are orientatably mounted, said beam projecting in a cantilever manner from the two doors of a helicopter.

According to a further preferred embodiment of the present invention, said beam of high-strength metal for supporting the two photographic cameras is installed on a cage supported by a large crane (maximum height 30 m).

The invention is described in detail hereinafter with reference to the accompanying drawings, which illustrate a preferred embodiment given by way of non-limiting example only in that technical and constructional modifications can be made thereto without leaving the scope of the inventive idea.

BRIEF DESCRIPTION OF THE DRAWINGS

In said drawings, in which the method of the invention is visualised as specifically applied to the field of offshore platform installation principally for determining the exact distance between the centres of the ends of three support tubes driven into the sea bed.

DETAILED DESCRIPTION OF THE PREFERRED EMBODIMENTS

Figure 1:
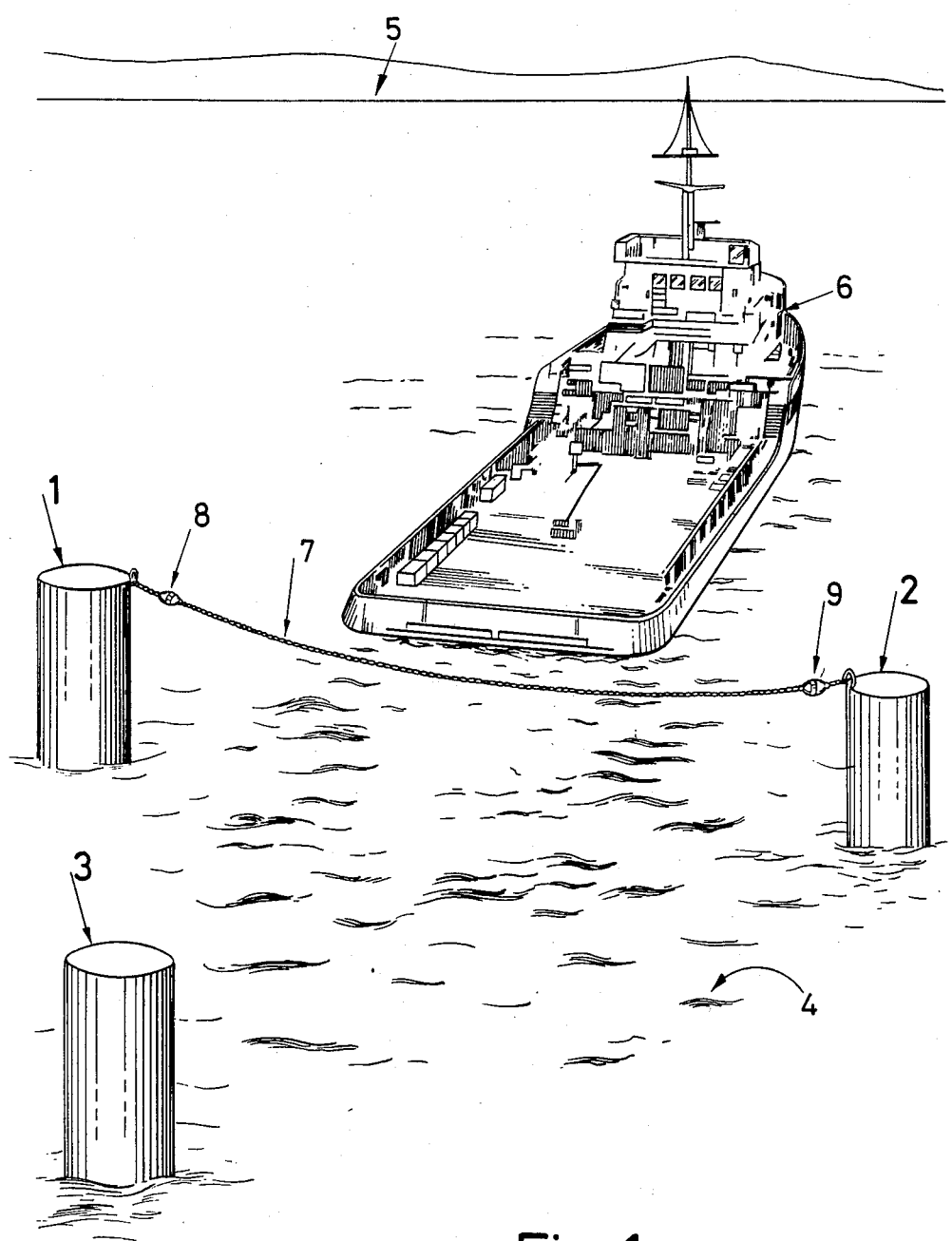
FIG. 1 shows the stage in which a chain of known length is hooked between any two support tubes.

In the figures, the reference numerals 1, 2 and 3 respectively indicate three support tubes of diameter 2–3 m which are driven into the bed of the sea 4 generally at a distance of 20–50 km from the shore line 5 and emerge by 8–12 m from the sea, to support an overlying platform, the legs of which have to accurately abut against the ends of said tubes.

In order to apply the method of the invention to the required determination of the distance between the centres of the three tubes, said centres not being marked, between the two tubes 1 and 2 there is hooked with the aid of a watercraft 6 an inextensible steel chain 7 which cannot become tangled and to which there are rigidly fixed two reference markers or signals 8 and 9 respectively, disposed at a distance apart which has been accurately pre-measured in the laboratory.

The two reference markers 8 and 9 are of such a size that they, and also the chain links, are reliably visible on photograms shot from a distance of 30–40 m, and the chain 7 is stretched such that it never touches the surface of the sea 4.

Figure 2:
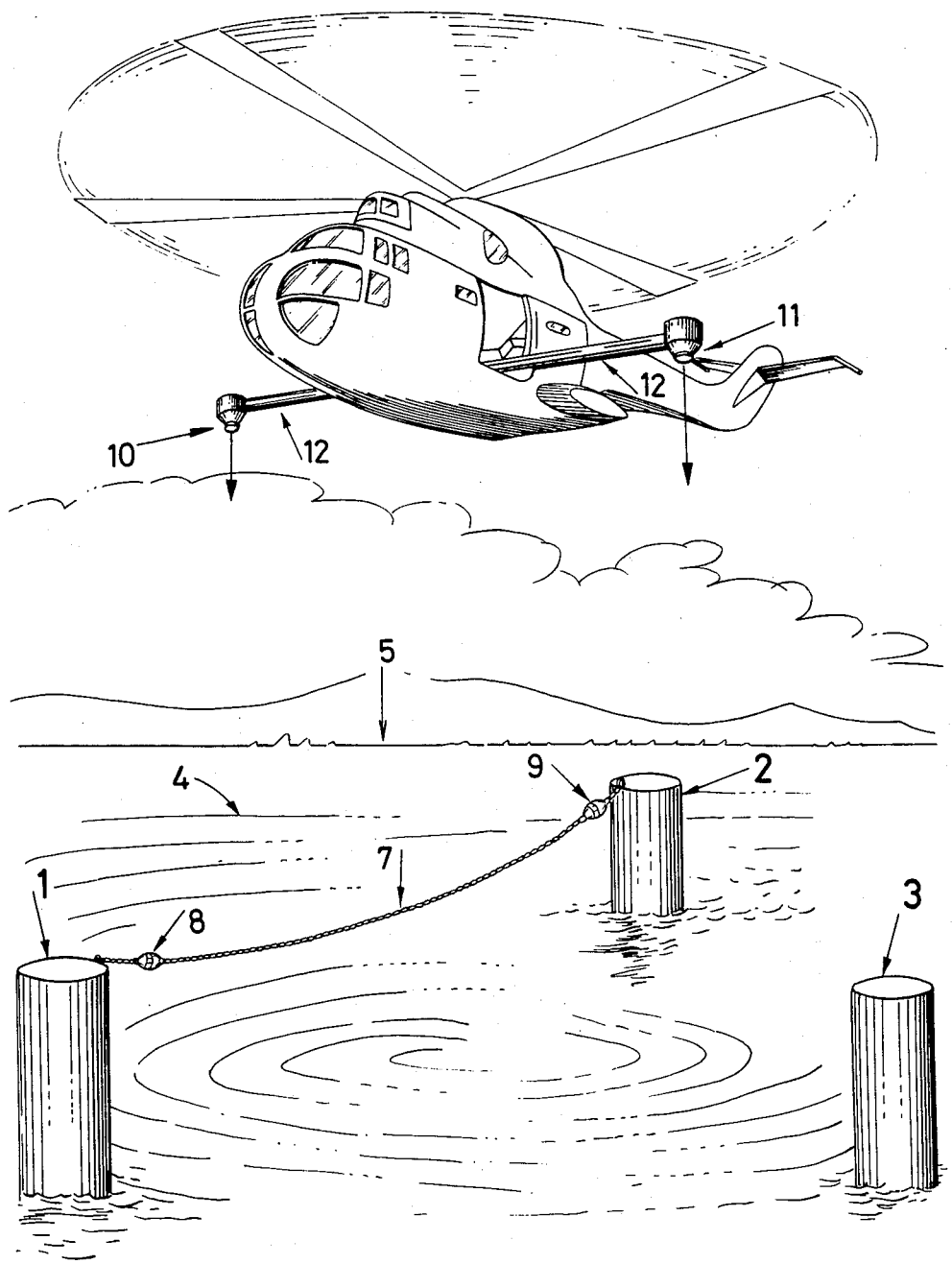
FIG. 2 shows the stage in which a photographic shot is taken from a helicopter, in a preferred embodiment.

The tube-chain system is then photographed with two metric photographic cameras 10 and 11 respectively, which are mutually synchronised and are mounted orientatably at the ends of a high-strength metal beam 12 of length about 6 m and projecting in a cantilever manner from the two doors of a helicopter 13 lying at a height of about 30 m. Cameras 10 and 11 are orientated parallel to one another perpendicular to beam 12, as shown in FIG. 2.

Figure 3:
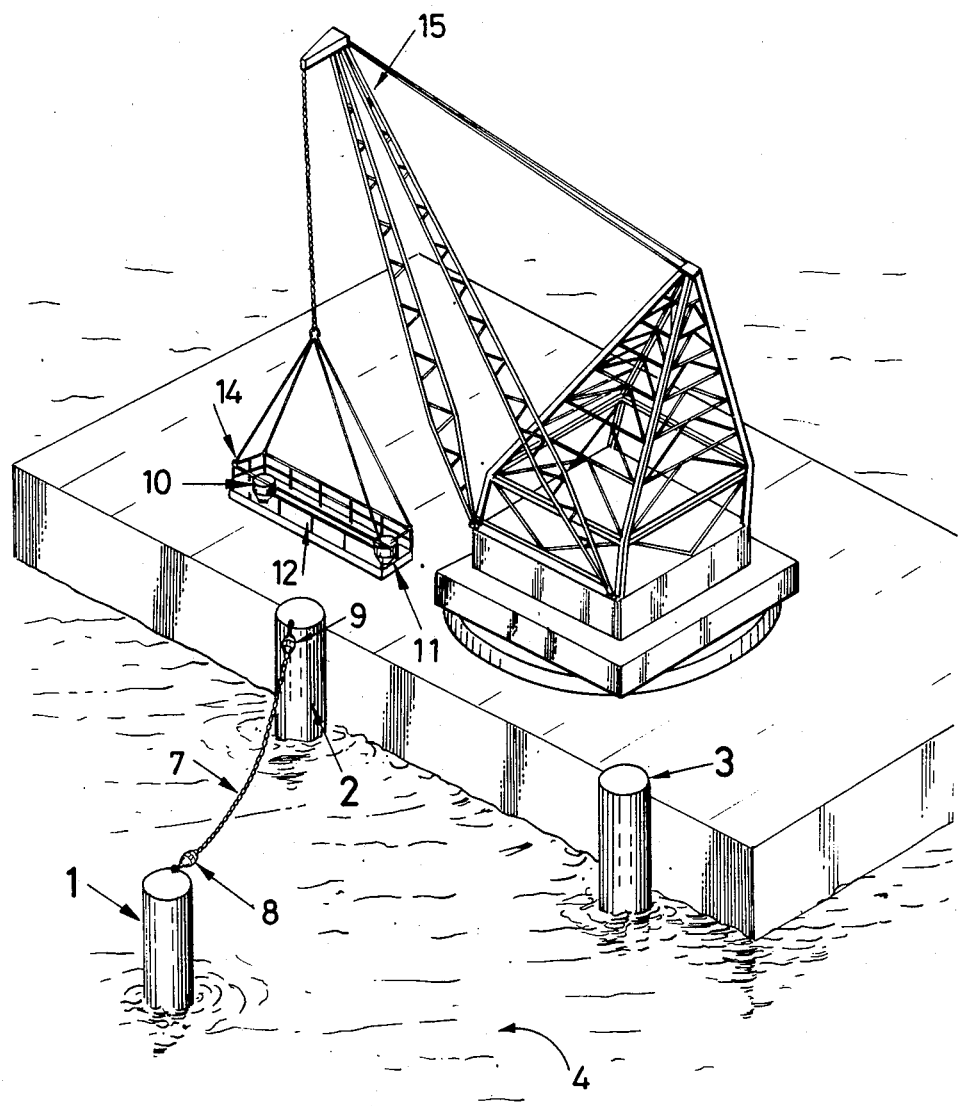
FIG. 3 shows the stage in which the photographic shot is taken with the aid of a large crane, in a further embodiment of the invention.

According to a modification of the invention, the beam 12 supporting the two photographic cameras 10 and 11 at its ends is installed on a cage 14 supported (see FIG. 3) at a height of about 30 m by a large crane 15.

Figure 4:
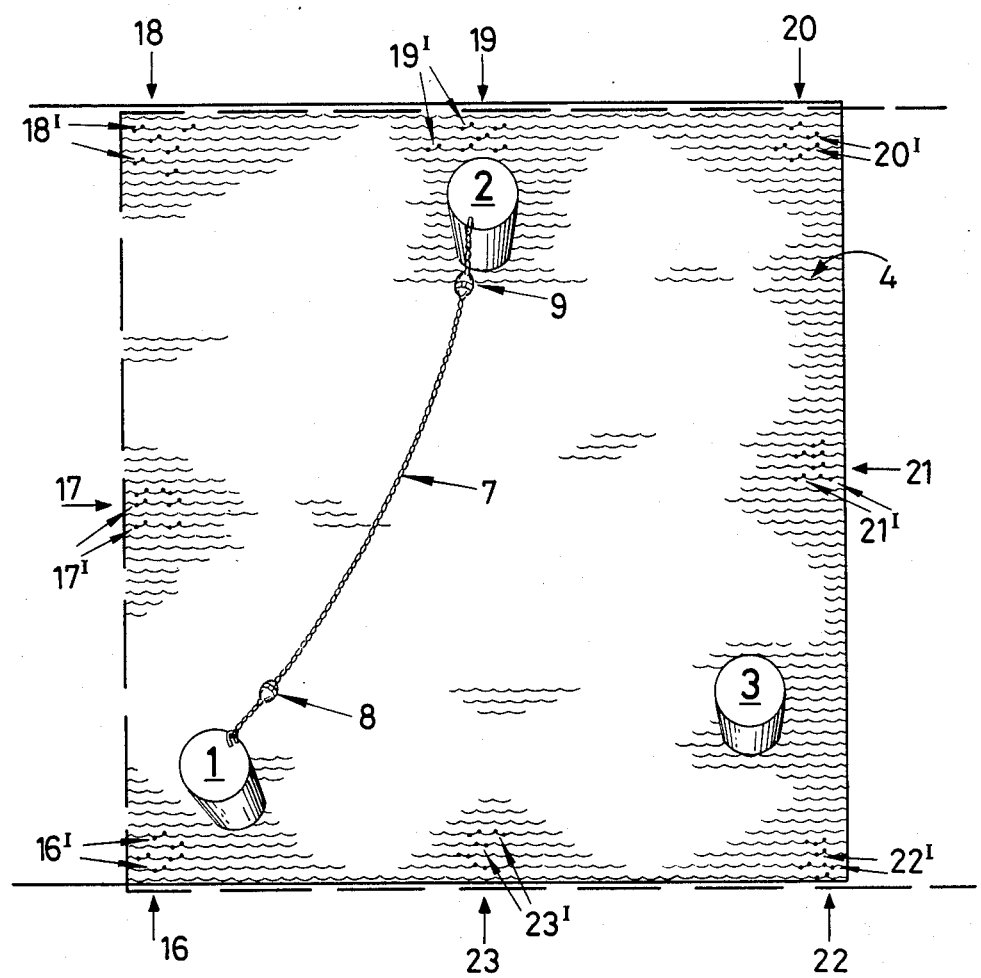
FIG. 4 shows the stereoscopic optical model obtained by the stereoplotter, and on which the measurements are made.

The pairs of photographs obtained in this manner are then inserted into a stereoplotter which provides a stereoscopic optical model (see FIG. 4) of the photographed object.

On this model, in positions corresponding with each of the eight conventional perimetral locations of photogrammetric orientation 16, 17, 18, 19, 20, 21, 22 and 23, and using the moving arrow of the stereoplotter, determinations are made of the depths (z axis) of a suitable number of points $16^I \ldots 23^I$ respectively, evenly situated one half on the crests (positive maximum) and the other half in the troughs (negative maximum) of the undulations of the sea 4. The mean value of these measurements thus gives the mean level of the water surface and consequently the mean plane, which must be horizontal.

By suitably rotating the optical model in such a manner as to bring the level of said eight locations to the said determined mean level, the optical model becomes correctly orientated.

On the optical model orientated in this manner it is now possible, again using the moving arrow of the stereoplotter, to accurately measure the length, on the photographic scale, of the catenary arc lying between the two well visible reference markers or signals 8 and 9 of the chain 7.

Said measurement is made by taking the sum of the lengths of small arc portions corresponding for example to one link (also visible) of said chain.

At this point, by taking the direct ratio of said determined value to the accurately pre-measured value of the chain portion 8-9, the conversion scale is obtained, from which any real distance can be obtained by making a corresponding linear measurement on the model.

I claim:

1. A method for the stereophotogrammetric survey of large dimension objects situated on the sea comprising:
   (i) providing two synchronized metric photographic cameras mounted apart from one another at a known distance of about 6 meters in parallel orientation at a distance of about 30 meters from the object to be surveyed;
   (ii) providing an inextensible chain in full view of said cameras within the area to be surveyed, said chain having two reference markers mounted thereon at a known distance from each other, said markers being of sufficient size to be reliably visible on photograms taken from a distance of about 30 to 40 meters, the links of said chain also being of sufficient size to be visible on photograms taken from a distance of about 30 to 40 meters;
   (iii) simultaneously photographing the object to be surveyed and said inextensible chain with said synchronized metric photographic cameras to provide two simultaneous photographs of the object and said chain;
   (iv) obtaining a stereoscopic optical model of the object to be measured from said two simultaneous photographs by means of a stereoplotter;
   (v) measuring on said stereoscopic optical model eight sets of points grouped in the eight conventional perimetral locations of photogrammetric orientation, one half of said points being situated at the crest level and the other half of said points being situated at the trough level of waves of the sea;
   (vi) statistically processing said crest and trough measurements to determine the mean horizontal plane;
   (vii) orientating said stereoscopic optical model on said mean horizontal plane by suitable rotation of said stereoscopic optical model;
   (viii) measuring on said stereoscopic optical model in the photographic scale the length of the catenary arc between said two reference markers by summing the lengths of the small arc portions corresponding to each link of said chain;
   (ix) determining the scale of said stereoscopic optical model by comparing said measured length of said catenary arc to the known distance between said reference markers on said inextensible chain; and
   (x) calculating actual dimensions of the object by measuring linear distances on said stereoscopic optical model and converting said measured linear distances into actual object dimensions using said stereoscopic optical model scale.

2. The method according to claim 1 wherein said two synchronized metric photographic cameras are mounted apart at a known distance by being mounted at each end of a beam constructed of high-strength metal.

3. The method according to claim 2 wherein said beam is mounted in cantelever fashion projecting from the two side doors of a helicopter.

4. The method according to claim 2 wherein said beam is installed by a cage supported by a crane.

5. A method for the stereophotogrammetric survey of large dimension objects situated on land comprising:
   (i) providing two synchronized metric photographic cameras mounted apart from one another at a known distance of about 2 meters in parallel orientation at a distance of about 30 meters from the object to be surveyed;
   (ii) providing an inextensible chain in full view of said cameras within the area to be surveyed, said chain having two reference markers mounted thereon at a known distance from each other, said markers being of sufficient size to be reliably visible on photgrams taken from a distance of about 30 to 40 meters, the links of said chain also being of sufficient size to be visible on photgrams taken from a distance of about 30 to 40 meters;
   (iii) simultaneously photographing the object to be surveyed and said inextensible chain with said synchronized metric photographic cameras to provide two simultaneous photographs of the object and said chain;
   (iv) obtaining a stereoscopic optical model of the object to be measured from said two simultaneous photographs by means of a stereoplotter;
   (v) measuring on said stereoscopic optical model eight sets of points grouped in the eight conventional perimetral locations of photogrammetric orientation, one half of said points being situated at the maximum level and the other half of said points being situated at the minimum level of the ground undulations;
   (vi) statistically processing said maximum and minimum ground undulation measurements to determine the mean horizontal plane;
   (vii) orientating said stereoscopic optical model on said mean horizontal plane by suitable rotation of said stereoscopic optical model;
   (viii) measuring on said stereoscopic optical model in the photographic scale the length of the catenary arc between said two reference markers by summing the lengths of the small arc portions corresponding to each link of said chain;
   (ix) determining the scale of said stereoscopic optical model by comparing said measured length of said catenary arc to the known distance between said reference markers on said inextensible chain; and
   (x) calculating actual dimensions of the object by measuring linear distances on said stereoscopic optical model and converting said measured linear distances into actual object dimensions using said stereoscopic optical model scale.

6. The method according to claim 5 wherein said two synchronized metric photographic cameras are mounted apart at a known distance by being mounted at each end of a beam constructed of high-strength metal.

7. The method according to claim 6 wherein said beam is mounted in cantelever fashion projecting from the two side doors of a helicopter.

8. The method according to claim 7 wherein said beam is installed on a cage supported by a crane.

* * * * *